Dec. 26, 1967     R. W. JOHANSEN     3,360,052
POWER LIFT SYSTEM FOR TRACTORS
Filed Dec. 7, 1964     2 Sheets-Sheet 1

Inventor
Roy W. Johansen
By Kenneth P. Tuckrist
Attorney

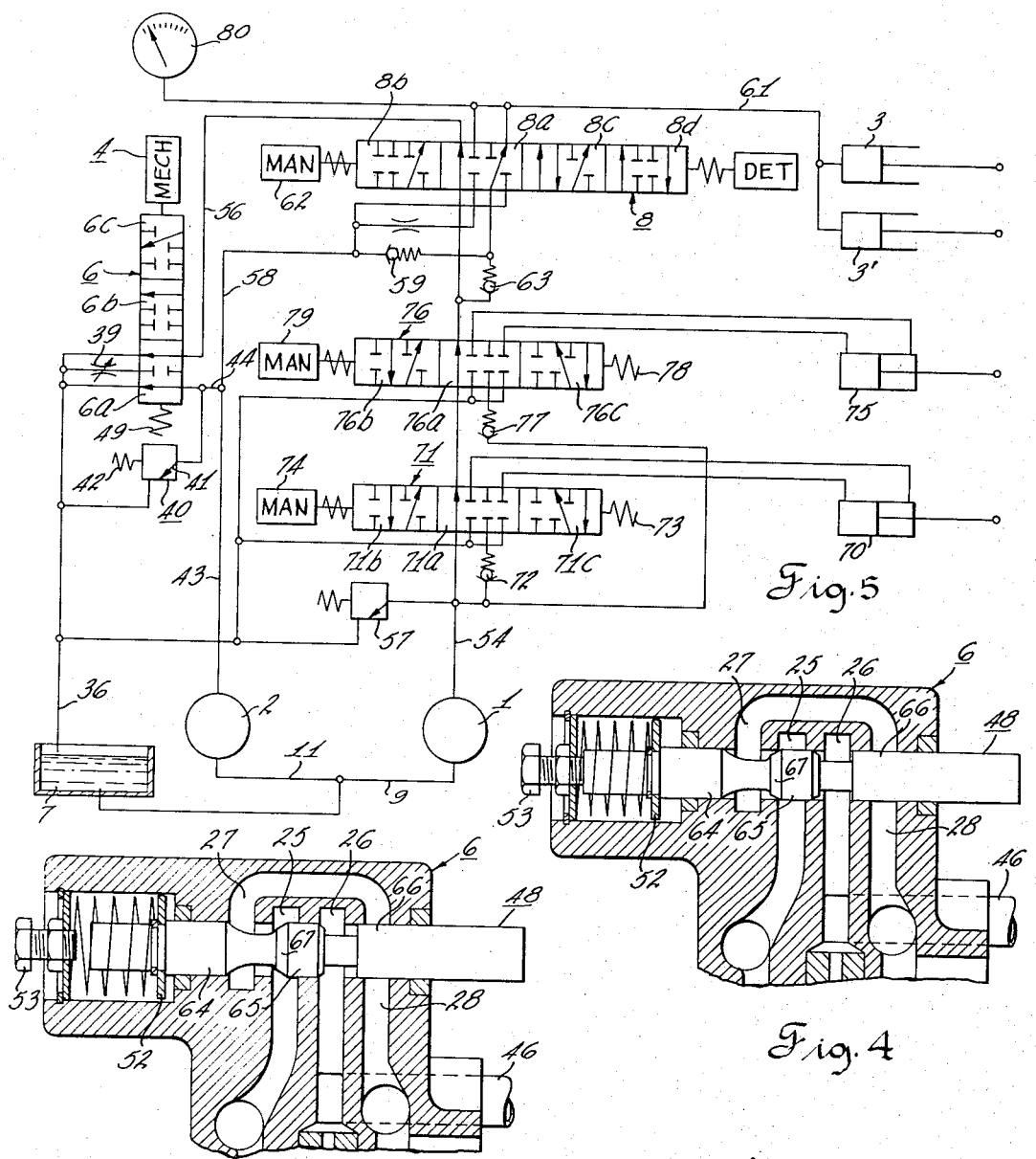

United States Patent Office 3,360,052
Patented Dec. 26, 1967

3,360,052
POWER LIFT SYSTEM FOR TRACTORS
Roy W. Johansen, West Allis, Wis., assignor to Allis-Chalmers Manufacturing Company, Milwaukee, Wis.
Filed Dec. 7, 1964, Ser. No. 416,555
7 Claims. (Cl. 172—7)

ABSTRACT OF THE DISCLOSURE

A hydraulic system for use with a tractor implement combination providing an implement power lift and automatic weight distribution.

---

This invention relates to power lift systems for tractors and is concerned more particularly with a combined power lift and automatic weight transfer system.

U.S. Patent 2,679,199 issued on May 25, 1954 to W. F. Strehlow for "Power Lift Means Affording Depth Regulation of Tractor Propelled Implements," discloses a combined hydraulic power lift and automatic weight transfer system which is provided with a manually operable control valve for raising and lowering a tractor connected implement at the will of the operator, and with a draft sensing device for controlling the transfer of weight from the implement to the tractor while the implement is advanced in working condition.

Generally, it is an object of the present invention to provide an improved power lift and weight transfer system for accomplishing the mentioned purposes, that is, to automatically and quickly transfer weight from the implement to the tractor drive wheels for increased traction when needed, and to remove the additional weight from the tractor wheels when it is no longer needed for traction.

Generally, it is an object of the invention to provide an improved hydraulic power lift and weight transfer system which will take care of the hereinbefore mentioned requirements in a practical and fully satisfactory manner.

More specifically, it is an object of the invention to provide an improved pump and valve arrangement which lends itself for use in a hydraulic system incorporating one circuit for implement lift and weight transfer purposes and another circuit, or several circuits, for performing other functions either simultaneously with or separately from and independently of said one circuit or conjointly.

Under certain conditions of operation, it is desirable to have an additional source of pressure fluid to augment the pressure fluid being suplied for weight transfer as usually a small pump or small capacity portion of a pump is used for weight transfer purposes.

Accordingly, it is an object of this invention to provide in a tractor having a two pump hydraulic system means for utilizing some of the pumped fluid of the larger pump for use in connection with the pumped fluid of the smaller pump in weight transfer.

Another object of the invention is to provide means for utilizing a portion of the output of a second pump to augment the temporary lack of capacity of a first pump normally used for weight transfer purposes and without suffering the disabilities engendered from combining the outputs of pumps of differing operating characteristics and without a loss of good control and undesirable abrupt response.

Another object of this invention is to provide an improved pump and valve arrangement of the hereinbefore outlined character, which is extremely simple in construction, efficient and reliable in operation, and which lends itself to manufacture at relatively low costs.

The foregoing and other objects and advantages are attained by the present invention's, various novel features of which will be apparent from the description herein of an embodiment of the invention, and will be set forth in the appended claims.

Referring to the accompanying drawings:

FIG. 3 is a detail view of the mechanically adjustable control valve of FIG. 1 in a first weight transfer position;

FIG. 4 is a view similar to FIG. 3 but showing the mechanically adjustable control valve in a second weight transfer position utilizing a portion of the output of one pump and the entire output of a second pump;

FIG. 5 is a schematic circuit diagram of a hydraulic system incorporating a circuit for implement lift and weight transfer, and two circuits for operating auxiliary double acting rams.

Figure 1:
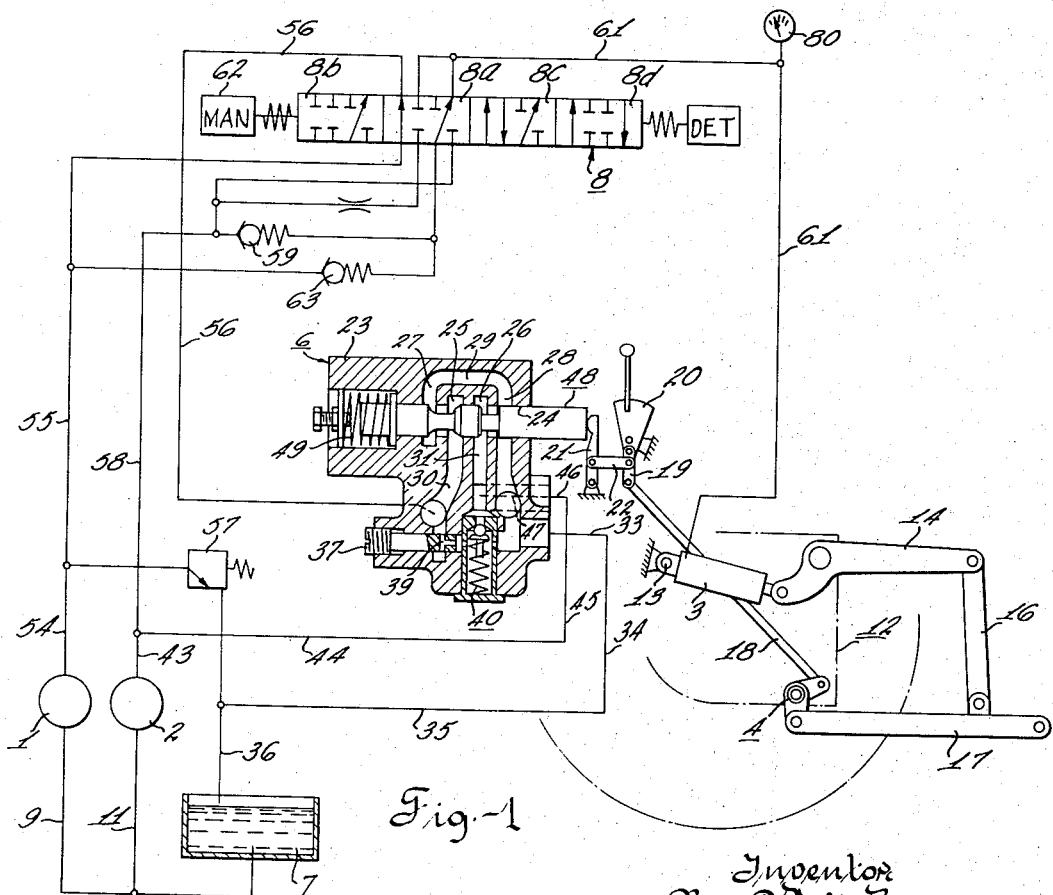
FIG. 1 is a diagrammatic view of a hydraulic power lift and weight transfer system incorporating the invention, a mechanically operated adjustable valve of the system being shown in an open position for return of fluid to a sump.

The implement lift and weight transfer system which is diagrammatically outlined in FIG. 1 comprises, in general, a first fluid high volume pump 1, a second fluid low volume pump 2, a single acting lifting ram or fluid motor 3, a draft sensing device 4, a spool type hydraulic control valve 6, a spool type hydraulic control valve 8 and a sump or reservoir 7. Driving power for the pumps is derived from a tractor motor, not shown, in a conventional manner; that is the pumps will be running as long as the tractor motor is running.

The pumps 1 and 2 have large and small output capacities, respectively, the pumps 1 and 2 being of conventional construction. Both pumps are connected in fluid receiving relation with the sump 7, the pump 1 being connected at its suction side with a sump line or duct 9, and the pump 2 being connected at its suction side with a sump line or duct 11.

A portion of the tractor on which pumps 1 and 2 and other components of the system are installed is shown in dash-dotted lines in FIG. 1 and generally designated by the reference character 12. The barrel end of the ram or fluid motor 3 is pivoted at 13 on the tractor body, and the plunger end of the ram is operatively connected with an implement lift arm 14 in a conventional manner. The lift arm 14 has a depending link connection 16 with the draft tongue 17 of an implement, such as a plow, not shown. The draft tongue 17 is hitched to the tractor body in a conventional manner through a draft sensing device 4 including a push rod 18 pivotally connected to the lower end of a link 19 which has the upper end thereof pivotally attached to the lower end of an operating lever 20. Lever 20 is pivotally connected at a midportion thereof to tractor 12. A midportion of link 19 is pivotally connected to a midportion of a lever 21 by means of a strap 22. Lever 21 is pivotally connected at is lower end to tractor 12 and the upper end of lever 21 is positioned adjacent the right hand end of spool valve 6 for actuation thereof.

In operation, when draft is transmitted from the tractor to an implement through the draft bar 17, draft sensing device 4 yields more or less depending on the magnitude of the draft and the adjustment of the sensing device; and the resulting reciprocating movement of rod 18 is communicated to the weight transfer valve 6 through the actuating linkage 21.

The weight transfer valve 6 which is shown in FIG. 1 is an open center, mechanically actuated, three position, five connection directional spool valve. It includes a casing 23 which has a valve bore 24 and axially spaced radial enlargements thereof presenting, respectively, a first inlet chamber 25; a second inlet chamber 26; and a first exhaust chamber 27 and a second exhaust chamber 28 which are connected by internal passage 29. The first inlet chamber 25 communicates with the fluid delivery side of first fluid pump 1 through an internal duct 30; the second inlet chamber 26 communicates with the fluid delivery side of pump 2 through an interior duct 31. The first and second exhaust chambers communicate with sump 7 through interior exhaust duct 32 and exterior exhaust ducts 33, 34, 35 and 36. Casing 23 is also provided with an adjustable restriction valve 37 which is threadedly received in a transverse opening 38 extending inwardly from the left-hand side of casing 23. The right-hand end of valve 37 is provided with an orifice 39 which provides a restrictive communication between exhaust duct 32 and internal connecting duct 30. This restrictive communication can be adjusted by rotating valve 37 so as to move the valve and contained orifice 39 towards the right. A relief valve 40 is positioned at the lower end of connecting duct 31. This relief valve 40 is of the usual type including a ball 41 biased to closed position by a spring 42, and in the event that hydraulic pressure in the second inlet chamber 26 becomes too high such pressure opens up a passage to sump 7 by depressing ball 41 against the pressure of spring 42.

The fluid connections between pump 2 and chamber 26 are external ducts 43, 44, 45 and 46; internal ducts 47 and 31.

A spool 48 is positioned in valve bore 24 and the exposed right-hand end of spool 48 is contacted by the upper end of lever 21 (FIG. 1) and actuated thereby axially toward the left in response to draft demand. The left-hand end of spool 48 is spring biased by means of spring 49 which is positioned between a plug member 51 attached to casing 23 and a shoulder 52 on spool 48 to maintain spool 48 in the neutral, open or no draft position shown in FIGS. 1 and 2. Plug member 51 is provided with an adjustable bolt 53 for limiting the movement of spool 48 to the left. The movement of spool 48 to the right is limited by the position of lever 21 and if lever 21 is not positioned to act on spool 48, then the movement of spool 48 to the right is limited by shoulder 52 contacting a portion of casing 23.

FIG. 1 shows control valve 6 in an open or no draft position which permits passage of fluid from the pumps 1 and 2 as follows. Fluid from pump 2 passes through a primary fluid passage including external ducts 43, 44, 45 and 46 into internal duct 47, duct 31, second inlet chamber 26, exhaust chamber 28, duct 32, to sump 7 by way of ducts 33, 34, 35 and 36. Fluid from pump 1 passes through a secondary fluid passage including duct 54, duct 55, spool valve 8, duct 56, through valve 6 by way of internal duct 30, first inlet chamber 25, exhaust chamber 27, internal duct 29, exhaust chamber 28, interior exhaust duct 32, exterior exhaust lines 33, 34, 35 and 36 to sump 7. In the event of excess pressure, there is provided a relief valve 57 positioned between ducts 54 and 36. As long as valve 6 remains in the position shown in FIG. 1 fluid from pumps 1 and 2 return to sump 7 without appreciable resistance. In operation of the tractor, the weight transfer valve 6 remains open as long as the draft transmitted by the draft bar does not exceed a predetermined amount. However, when the draft exceeds that amount, the spool 48 in the weight transfer valve 6 is shifted to the left to the position shown in FIG. 3 by operation of the draft sensing device 4 into a weight transferring position, and as a result the fluid discharge from pump 2 will be forced into valve 8 through connecting duct 58 and through a check valve 59 and depending on the condition of the valve 8 as more fully explained hereinbelow, will become effective to transfer implement weight to the tractor drive wheels.

The hydraulic control valve 8 which is diagrammatically shown in the upper part of FIG. 1 is an open center, four position, six connection, directional spool valve and for weight transfer operation valve 8 is positioned with block 8c in operative position. This hydraulic control valve is the same as that shown and described in copending application Ser. No. 241,710, filed Dec. 3, 1962, now Patent No. 3,183,977 and reference thereto may be had if further details of this valve construction are desired.

Referring to FIGS. 1 and 5, for lift purposes, valve 8 would be shifted to block 8b position by manual control 62. For lowering, valve 8 would be shifted to block 8d position. For holding, valve 8 would be positioned in block 8a position as shown in FIG. 1. For weight transfer, valve 8 would be shifted to block 8c position. Valve 6 would be positioned in the open position shown in FIG. 1 for all of the above mentioned operations.

Assuming that weight transfer operation is desired, valve 8 would be manually adjusted so that block 8c was in operating position and valve 6 would be in the position shown in FIG. 1. If the draft load increased beyond a certain set limit, draft sensing device 4 would move spool 48 to the left so that block 6b of valve 6 was in operating position as shown in FIGS. 3 and 5 whereupon fluid from pump 2 passing through duct 43 would be blocked by valve 6 and accordingly the fluid would pass through duct 58 over check valve 59 through valve block 8c through duct 61 to ram 3 actuating same to transfer a portion of the weight of the implement to the tractor drive wheels. Upon the draft demand becoming reduced below the aforementioned amount, spring 49 would return spool 48 to the no draft position shown in FIG. 1. During this entire weight transfer operation, pump 1 would have an open path of low resistance for its fluid through valves 8 and 6 and return to sump. In other words pump 1 would be under substantially no load.

Now assuming that the draft load as sensed by draft sensing device 4 is of greater magnitude than the range selected for 6b operation; then lever 21 in response to the movement of draft sensing device 4 would move spool 48 to its extreme left position abutting stop bolt 53 positioning block 6c in operating position (FIG. 4 and 5). Pump 2 would continue to function transferring weight as described in the previous paragraph but now pump 2 would get an assist from pump 1 in such weight transfer.

In other words, with block 6c positioned in operating position, pump 1 would no longer have a substantially unrestricted path through valve 6 to sump 7. In fact the fluid of pump 1 would have to pass through a high resistance fluid duct in the nature of restricted orifice 39 to return to sump. This in turn would increase the fluid pressure in the line resulting in fluid flowing past valve 63 (FIG. 5) and joining the fluid of pump 2 to aid in actuating ram 3 in its weight transfer operation. When the draft demand lessens in response to weight transfer, spring 49 would return spool 48 first to its traction boost position (6b) and with a further lessening in draft requirements to open position (6a).

Figure 2:
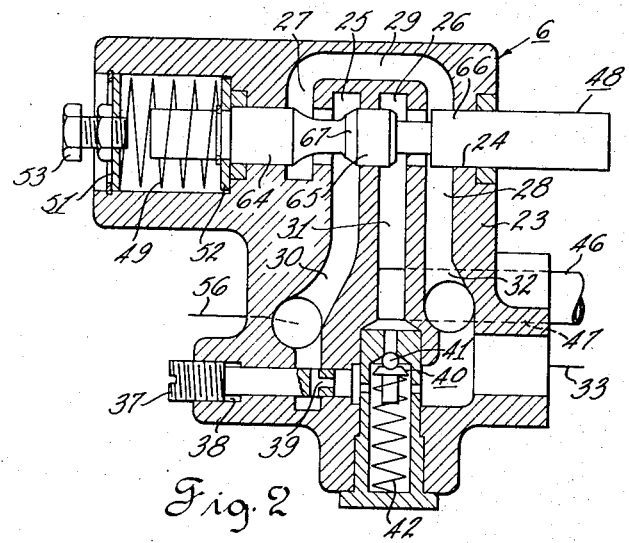
FIG. 2 is an enlarged view of the mechanically adjustable control valve of FIG. 1.

Valve 6 is so constructed that when pump 1 is called upon to assist pump 2 in weight transfer that such assist will not result in excessive, rapid or jerky movement of the ram 3. Referring to FIG. 2 it is seen that spool 48 is provided with three lands 64, 65 and 66. In FIG. 2 land 64 is inoperative, land 65 blocks first inlet chamber 25 from second inlet chamber 26, and land 66 is inoperative. When spool 48 is moved to the left to weight transfer position 6b, as is indicated in FIGS. 3 and 5, land 64 is inoperative, land 65 blocks first inlet chamber 25 from second inlet chamber 26 and land 66 blocks second inlet chamber 26 from exhaust chamber 28. When spool 48 is moved to its extreme left position 6c as shown in FIGS. 4 and 5, land 64 is inoperative, land 65 blocks first inlet chamber 25 from exhaust chamber 27 and second inlet chamber 26 and land 66 blocks second inlet chamber 26 from exhaust chamber 28. The chamfered configuration 67 of spool 48 between lands 64 and 65 should be noted. This configuration is provided so that as spool 48 is approaching the 6c position there will be a throttling effect on the fluid passing into exhaust chamber 27 and this throttling effect will gradually and uniformly increase until the spool is moved to its extreme left position resulting in applying an increase of fluid to the fluid of pump 2 without surges or undesirable abrupt response and without resulting in loss of good control at the time check valve 63 opens. Check valve 63 can open during the throttling process and does not require that land 65 is completely blocking first inlet chamber 25 from communication with the first exhaust chamber 27 before opening.

In the diagram of FIG. 5, standard symbols of the joint Industry Conference are used to show the spool valves 6 and 8 including check valves 59, 63 are associated with the manual control mechanism 62 for valve 8. Instead of one ram 3 as in FIG. 1, FIG. 5 shows two rams 3 and 3′ in parallel, as the use of two parallel rams is more common in practice than only one ram. The pumps 1 and 2, the sump 7, the valve 6 together with the draft sensing device 4, and the spring loaded relief valve 40 are also shown symbolically in FIG. 5.

In addition to the components explained hereinbefore with references to FIGS. 1 to 4, the diagram of FIG. 5 symbolically shows a first auxiliary double acting ram 70 and associated three position, five connection directional valve 71, together with check valve 72, centering mechanism 73 and manual actuating mechanism 74.

The system illustrated by FIG. 5 further includes a second auxiliary double acting ram 75 and associated three position, five connection direction control valve 76 together with check valve 77, centering mechanism 78 and manual actuating mechanism 79. A pressure gauge 80 indicates the pressure in rams 3, 3′.

In operation of the system shown in FIG. 5, both pumps 1 and 2 are normally running, the same as explained in connection with FIG. 1. Valve 8 as shown in FIG. 5 is in the hold position illustrated by the block 8a in FIG. 5. The block 8b in FIG. 5 illustrates the lift position, the block 8c illustrates the weight transfer position; and the block 8d illustrates the lowering position.

The valve 71 shown in FIG. 5 is adjustable to a hold position illustrated by the block 71a; to a lift position illustrated by the block 71b; and to a lowering position illustrated by the block 71c.

Similarly, the valve 76 shown in FIG. 5 is adjustable, to a hold position illustrated by the block 76a; to a lift position illustrated by the block 76b; and to a lowering position illustrated by the block 76c.

The valve 6 shown in FIG. 5 is adjustable to an open position illustrated by block 6a; to a first weight transfer position illustrated by block 6b; and a second or auxiliary weight transfer position illustrated by block 6c.

The system shown in FIG. 5 includes a plurality of fluid motors, considering the parallel connected rams 3, 3′ as one such fluid motor and the rams 70 and 75 as additional fluid motors. The valves 6, 8, 71 and 76, check valves 63, 59, 72, 77 and the fluid ducts, the pumps, valves, fluid motors and sump generally represent fluid distributing means for conveying the fluid output of the first pump 1 to any one of the mentioned fluid motors independently of the fluid output of the second pump 2, and for conveying the fluid output of the second pump 2 to one of the fluid motors, namely the parallel connected rams 3, 3′, independently of the fluid output of the first pump 1 or conjointly therewith.

To illustrate, let it be assumed that the valve 8 is in the weight transfer position 8c, the valve 6 is in the weight transfer position 6c, and the valve 71 is in the lift position 71b. In that case the first pump 1 will deliver pressure fluid through the check valve 72 into the lefthand end of the ram 70 independently of the second pump 2 and the second pump 2 will deliver pressure fluid through check valve 59 into the fluid motor 3, 3′ independently of the first pump.

Likewise the fluid discharge of the first pump 1 may be directed to either side of the ram 75 by manipulation of the valve 76 while the valve 8 is in its weight transfer position or any other position, and such fluid delivery of pump 1 will be independent of the fluid delivery of pump 2.

If valve 6 is positioned as in block 6c and valve 8 is positioned as in block 8c then a portion of the output of pump 1 will be added to the output of pump 2 for actuating rams 3, 3′. With the valves in this position the fluid from pump 2 is blocked by valve 6 from returning to sump and accordingly overcomes check valve 59 to activate rams 3, 3′. The output of pump 1 is diverted by valve 6 to pass through restricted orifice 39 thereby raising the pressure in the lines of pump 1 until check valve 63 is overcome and a portion of the output of pump 1 is added to the output of pump 2 for actuating rams 3, 3′.

It should be understood that it is not intended to limit the invention to the specific systems herein shown and described for purposes of illustrations, as various modifications within the scope of the appended claims may occur to persons skilled in the art.

The embodiments of the invention in which an exclusive property or privilege is claimed are defined as follows:

1. A hydraulic system comprising a reservoir, low volume and high volume pumping means connected at their intake sides with said reservoir, primary fluid passage means having an inlet connected to the delivery side of said low volume pumping means, secondary fluid passage means having an inlet connected to the delivery side of said high volume pumping means; a fluid motor; and a fluid control valve operatively connected with said primary and secondary fluid passage means and with said fluid motor for energizing the latter selectively by said low volume pumping means independently of said high volume pumping means, by said low volume and high volume pumping means conjointly; a weight transfer valve connected to said secondary passage means including a low resistance fluid duct and a high resistance fluid duct connected parallel with each other in fluid delivering relation with said reservoir, and said weight transfer valve including a valve mechanism selectively operable to direct the fluid output of said high volume pumping means through said low resistance fluid duct while said fluid motor is energized by said low volume pumping means, to direct the fluid output of said high volume pumping means to said high resistance fluid duct while said fluid motor is energized conjointly by said low volume and high volume pumping means.

2. A hydraulic system as is recited in claim 1 and wherein said high resistance duct is provided with means for varying the resistance of said duct including a manually adjustable valve for regulating the size of said duct.

3. A hydraulic system as is recited in claim 1 including means in said low resistance duct for substantially uniformly throttling the axial flow of fluid therethrough or diverting said flow to said high resistance duct.

4. A hydraulic system comprising a reservoir, low volume and high volume pumping means connected at their intake sides with said reservoir, primary fluid passage means having an inlet connected to the delivery side of said low volume pumping means, secondary fluid passage means having an inlet connected to the delivery side of said high volume pumping means; a fluid motor; and a manual fluid control valve operatively connected with said primary and secondary fluid passage means and with said fluid motor for energizing the latter selectively by said low volume pumping means independently of said high volume pumping means, for energizing said fluid motor by said low volume and high volume pumping conjointly and for deenergizing said fluid motor by diverting both said low volume and high volume pumping means; a weight control valve connected to said secondary passage means including a low resistance fluid duct and a high resistance fluid duct connected parallel with each other in fluid delivery relation with said reservoir, and said weight control valve including a valve mechanism selectively operable to direct the fluid output of said high volume pumping means to said low resistance fluid duct while said fluid motor is energized by said low volume pumping means, to direct the fluid output of said high volume pumping means to said high resistance fluid duct while said fluid motor is energized conjointly by said low volume and high volume pumping means, and to direct the fluid output of both pumping means to said reservoir by way of low resistance ducts when said fluid motor is energized by neither pumping means.

5. A hydraulic system as is recited in claim 2 and wherein means is provided for throttling the axial flow of fluid through said low resistance means comprises said valve mechanism including a spool having a land portion chamfered to present a working surface coacting with said duct to gradually shut off the flow of fluid through said low resistance duct as said land is moved toward said coacting portion of said duct.

6. A hydraulic system comprising a tractor; an implement connected to said tractor; a draft sensing device carried by said tractor and positioned between said tractor and said implement for sensing the draft load of said implement; a reservoir; low volume and high volume pumping means connected at their intake sides with said reservoir, primary fluid passage means having an inlet connected to the delivery side of said low volume pumping means, secondary fluid passage means having an inlet connected to the delivery side of said high volume pumping means; a fluid motor; and fluid control means operatively connected with said primary and secondary passage means and with said fluid motor for energizing the latter selectively by said low volume pumping means independently of said high volume pumping means, for energizing said fluid motor by said low volume and high volume pumping means conjointly; a weight transfer valve connected to said secondary passage means including a low resistance fluid duct and a high resistance fluid duct connected parallel with each other in fluid delivering relation with said reservoir, and said weight transfer valve including a valve mechanism responsive to changes in draft loading to direct the fluid output of said high volume pumping means to said low resistance fluid duct while said fluid motor is energized by said low volume pumping means, and to direct the fluid output of said high volume pumping means to said high resistance fluid duct while said fluid motor is energized conjointly by said low volume and high volume pumping means, and to divert the fluid output of both pumping means to said reservoir by way of low resistance ducts in response to a no draft condition sensed by said draft sensing means.

7. A hydraulic system comprising a tractor; an implement connected to said tractor; a draft sensing device carried by said tractor and positioned between said tractor and said implement for sensing the draft load of said implement; a reservoir; low volume and high volume pumping means connected at their intake sides with said reservoir, primary fluid passage means having an inlet connected to the delivery side of said low volume pumping means, secondary fluid passage means having an inlet connected to the delivery side of said high volume pumping means; a fluid motor; and a fluid control valve operatively connected with said primary passage means, said secondary passage means, and with said fluid motor for energizing the latter selectively by said low volume pumping means independently of said high volume pumping means, by said low volume and high volume pumping means conjointly; a weight transfer valve connected to said secondary passage means including a low resistance fluid duct and a high resistance fluid duct connected parallel with each other in fluid delivering relation with said reservoir, and said weight transfer valve including a valve element connected to said draft sensing device responsive to changes in draft loading sensed by said draft sensing mechanism to direct the fluid output of said high volume pumping means to said low resistance duct while directing the fluid output of said low volume pumping means to said fluid motor for activating same, and to direct the fluid output of said high volume pumping means to said high resistance duct so as to divert some fluid output thereof to assist the fluid output of said low volume pumping means to energize said fluid motor.

References Cited
UNITED STATES PATENTS

| | | | |
|---|---|---|---|
| 2,679,199 | 5/1954 | Strehlow | 172—8 |
| 2,777,375 | 1/1957 | Carlin et al. | 172—8 |
| 2,914,125 | 11/1959 | Tanke et al. | 172—8 |
| 3,002,571 | 10/1961 | Kersey et al. | 172—9 |
| 3,013,617 | 12/1961 | Keckenkamp | 172—8 |

ABRAHAM G. STONE, *Primary Examiner.*

WILLIAM A. SMITH III, *Examiner.*